(12) United States Patent
George et al.

(10) Patent No.: US 10,599,742 B2
(45) Date of Patent: Mar. 24, 2020

(54) SHARING AND CONSUMING WEB CONTENT ACROSS MULTIPLE DEVICES

(71) Applicant: Adobe Inc., San Jose, CA (US)

(72) Inventors: William Brandon George, Pleasant Grove, UT (US); Kevin Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 260 days.

(21) Appl. No.: 13/960,541

(22) Filed: Aug. 6, 2013

(65) Prior Publication Data
US 2015/0046832 A1 Feb. 12, 2015

(51) Int. Cl.
| | |
|---|---|
| G06F 16/00 | (2019.01) |
| G06F 16/958 | (2019.01) |
| H04L 29/08 | (2006.01) |
| G06F 9/48 | (2006.01) |
| G06F 16/178 | (2019.01) |
| G06F 9/445 | (2018.01) |

(52) U.S. Cl.
CPC .......... G06F 16/958 (2019.01); G06F 9/4451 (2013.01); G06F 9/4856 (2013.01); G06F 16/00 (2019.01); G06F 16/178 (2019.01); H04L 67/02 (2013.01); H04L 67/1095 (2013.01); H04L 67/14 (2013.01)

(58) Field of Classification Search
CPC ..... H04L 67/14; H04L 67/02; H04L 67/1095; G06F 9/4451; G06F 9/4856; G06F 17/30165; G06F 17/30174; G06F 17/30179; G06F 16/00; G06F 16/178
See application file for complete search history.

(56) References Cited

U.S. PATENT DOCUMENTS

| | | | |
|---|---|---|---|
| 7,702,729 B2 | 4/2010 | Johanson et al. | |
| 7,870,272 B2 | 1/2011 | Berkowitz et al. | |

(Continued)

OTHER PUBLICATIONS

Sohn, et al., "Myngle: Unifying and Filtering Web Content for Unplanned Access Between Multiple Personal Devices", Nokia Research Center, University of Toronto, UbiComp '11, Sep. 17-21, 2011, Beijing, China, pp. 257-266.

(Continued)

*Primary Examiner* — Amy Ng
*Assistant Examiner* — Sajeda Muhebbullah
(74) *Attorney, Agent, or Firm* — Finch & Maloney PLLC

(57) ABSTRACT

Techniques are disclosed for sharing and consuming web content across multiple computing devices. Each device registers with an account on a cloud-based service using a unique identifier. When one of the registered devices requests a web page, a set of rules is processed by the cloud-based service to determine whether the page content should be shared with other registered devices. If the rules are satisfied, the cloud-based service requests and receives the content from a content provider in various formats that are compatible with each of the registered devices. Once all assets associated with the content are received by the cloud-based service, the content is shared by pushing the content out to each registered device in the compatible format. In some cases, the scroll position is adjusted automatically so that the user may resume reading at the same point where she left off with another registered device.

21 Claims, 5 Drawing Sheets

(56) References Cited

U.S. PATENT DOCUMENTS

| | | | |
|---|---|---|---|
| 8,010,901 B1 | 8/2011 | Rogers | |
| 8,015,569 B2 | 9/2011 | Cho et al. | |
| 8,260,879 B2* | 9/2012 | Chan | G06F 9/4856 |
| | | | 709/217 |
| 2009/0063690 A1 | 3/2009 | Verthein et al. | |
| 2010/0198944 A1* | 8/2010 | Ho | H04L 12/189 |
| | | | 709/217 |
| 2011/0029891 A1 | 2/2011 | Kim et al. | |
| 2011/0055627 A1* | 3/2011 | Zawacki | H04L 67/14 |
| | | | 714/15 |
| 2011/0126168 A1 | 5/2011 | Ilyayev | |
| 2012/0023410 A1* | 1/2012 | Roth | G06F 3/04883 |
| | | | 715/737 |
| 2012/0066373 A1* | 3/2012 | Ochoa | G06F 9/4856 |
| | | | 709/224 |
| 2012/0079095 A1* | 3/2012 | Evans | G06F 8/61 |
| | | | 709/224 |
| 2012/0236159 A1* | 9/2012 | Tamura | H04N 21/8153 |
| | | | 348/207.1 |
| 2012/0311438 A1* | 12/2012 | Cranfill | G06F 17/30011 |
| | | | 715/256 |
| 2013/0024901 A1* | 1/2013 | Sharif-Ahmadi | G06F 17/30017 |
| | | | 725/114 |
| 2013/0283145 A1* | 10/2013 | Argent | G06F 17/241 |
| | | | 715/231 |
| 2013/0297739 A1* | 11/2013 | Faihe | G06Q 10/101 |
| | | | 709/217 |
| 2013/0332846 A1* | 12/2013 | Freedman | H01B 7/292 |
| | | | 715/745 |
| 2014/0032706 A1* | 1/2014 | Kuscher | H04L 67/1095 |
| | | | 709/217 |
| 2014/0171064 A1* | 6/2014 | Das | H04W 84/18 |
| | | | 455/426.1 |
| 2014/0185513 A1* | 7/2014 | Ahmadi | H04W 4/08 |
| | | | 370/312 |

OTHER PUBLICATIONS

Ghiani, et al., "Push and Pull of Web User Interfaces in Multi-Device Environments", CNR-ISTI, HIIS, Pisa, IT, AVI '12, May 21-25, 2012, Capri Island, Italy, 8 pages.

* cited by examiner

SHARING AND CONSUMING WEB CONTENT ACROSS MULTIPLE DEVICES

FIELD OF THE DISCLOSURE

This disclosure relates generally to the field of data processing, and more particularly, to techniques for sharing and consuming web content across multiple computing devices.

BACKGROUND

Increasingly, individuals are using more than one network-connected device to access content, such as web pages, documents, electronic mail/messaging, audio/video files, and other types of data. For instance, a person may use a personal computer (e.g., desktop or laptop PC) to begin reading a blog article while at work or at home, but leaves for an appointment before finishing the article. While en route, a mobile device (e.g., smart phone or tablet) may be used to finish reading the same article. However, when switching from one device to another in this manner the user often must locate the content anew and retrace her steps to the point where she left off.

DETAILED DESCRIPTION

Figure 1:
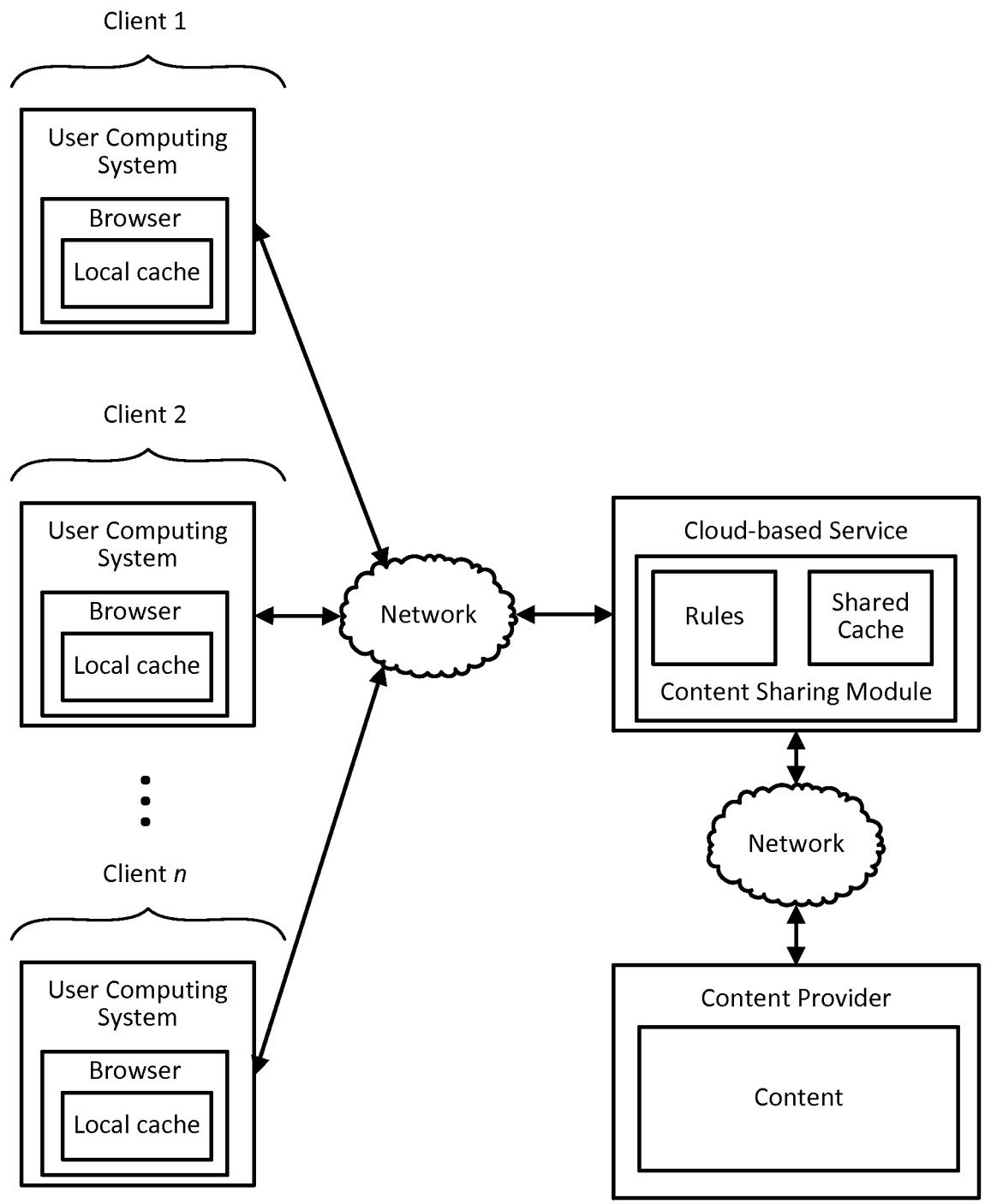
FIG. 1 illustrates an example client-server system configured in accordance with an embodiment of the present invention.

Techniques are disclosed for sharing and consuming web content across multiple computing devices using a cloud-based service. In one embodiment, each device registers with an account on a cloud-based service using a unique identifier. When one of the registered devices requests a web page or other type of content, a set of rules is processed by the cloud-based service to determine whether the page content should be shared with other registered devices. If the rules are satisfied, the cloud-based service requests and receives the content from a content provider in various formats that are compatible with each of the registered devices. Once all assets (e.g., HTML elements, JavaScript programs, images, audio/video files, etc.) associated with the content are received by the cloud-based service, the content is pushed to or otherwise shared with each of the registered devices by sending (also referred to as pushing) the content out to each device in the compatible format. Each device stores the pushed content locally. From that point on, each registered device has local access to the same content. If any device is offline, it can receive the shared content when it comes back online. In some cases, the scroll position within the web page (or other similar position marker) of the last device used to consume the content can be transferred to other registered devices. When the content is loaded, the scroll position is adjusted automatically so that the user may resume reading at the same point where she left off with the previous registered device.

General Overview

As mentioned above, a single person sometimes accesses the same web-based content using several different devices, such as a desktop PC and a smart phone, or a home PC and an office PC. However, when switching from one device to another, there are several potential limitations that affect the user's experience. For example, if the user begins reading an article on her home PC and then leaves for an appointment, her mobile device may not have network connectivity at certain locations along her route or at her destination, making it difficult, if not impossible, to retrieve the article using the mobile device. Even if the content can be retrieved, the user often must find the content again by entering the address (e.g., a uniform resource locator (URL)), searching for the content with a search engine, or manually navigating to it. After locating the content, it may take longer to load the content on a wireless mobile device than on wired device due to the slower data transmission speeds of, for example, cellular or other wireless networks. Once the content has loaded, the user may wish to find the place where she left off, usually by manually scrolling or searching through the content. In some instances, it may be desirable to enable other users (e.g., a spouse, friend or coworker) to access the same content using their own devices; however, the limitations described above are similarly pertinent. In still other cases, proxy servers cache web content for rapid retrieval by multiple users and/or devices. However, each device must be connected to the same proxy server to realize the benefits of caching. Further, since proxy servers do not automatically push cached content to other devices on the network, any device that disconnects from the proxy server (e.g., when a mobile device leaves a WiFi® network to join a cellular network) no longer has access to the cached content.

Thus, and in accordance with an embodiment of the present invention, techniques are provided herein for sharing and consuming web content across multiple computing devices. Web content generally refers to any information, data, applications, services or the like that can be accessed via a communications network, such as the Internet, and is not limited to the World Wide Web (e.g., content accessible within a private intranet). Each device that will consume the same web content registers with an account in a cloud-based service using a unique identifier. As used herein, a cloud refers to any client-server architecture in which at least some computation and/or data storage is relocated from a client computing system to one or more remote servers that provide the computation or data storage as a commodity or utility. A cloud may, for example, include a large collection of resources that can be interchangeably provisioned and shared among many clients.

When a registered device requests web content, the cloud-based service requests and receives the content from a content provider, which may be hosted by a server within the cloud or outside of the cloud. Further, the cloud-based service also requests and receives the same content formatted for each device registered to the same account. For example, if the device that originally requested the web content is using a Microsoft Windows®-based browser application, the web content will be formatted differently for that device than for another device using an Apple iOS®-based browser application. Such formatting differences may affect which assets are received in conjunction with the content. For example, a mobile device usually is constrained by a smaller display, less memory and a slower download speed than a desktop device, and therefore the size of the images retrieved for the mobile device may be smaller than the size of the images retrieved for the desktop device. Likewise, different browsers may utilize different versions of HTML, Java, multimedia players, etc., each of which may utilize different assets to present the same content. Accordingly, the cloud-based service may send several different requests for the content to the content provider depending on the various types of devices (and possibly various versions of operating systems and applications) registered with the cloud-based service.

Once the assets associated with the requested content are received, the cloud-based service automatically pushes the assets out to each of the respective registered devices. In this manner, each device has local access to the requested content as soon as the content is pushed out from the cloud-based service. By way of example, if a user requests a web page on a first registered device, the web page will be pushed out to that device and also to a second registered device, whether or not the second device is in active use. Subsequently, when the user switches from using the first device to the second device, the same web page will appear without requiring the user to otherwise locate and load the web page. In some such embodiments, any devices that are temporarily disconnected from the cloud will receive the content after they are reconnected to the cloud. In some embodiments, the cloud-based service compresses the content prior to pushing the content out to each registered device. In some embodiments, metadata associated with the content such as session cookies, histories, authentication credentials, and/or other assets can be propagated through the cloud-based service from one registered device to other registered devices in conjunction with the web content to facilitate a seamless transition from use of one device to another.

According to some embodiments, it is appreciated that pushing every requested asset out to every registered device may be detrimental to overall performance with respect to, for example, cost, speed, bandwidth, processing power, storage space, battery power and the like. Some devices, such as a mobile device, often have limited resources that may need to be used judiciously in comparison to other devices, such as a desktop PC. Accordingly, in such embodiments, the cloud-based service applies a set of predefined rules to the client request for web content to determine which assets should be automatically pushed out to each registered device. The rules may include, for example, one or more of the following:

Time spent viewing the content (e.g., content with low viewing time may not be pushed out).

Context of the content (e.g., via HTML content inspection, for instance, some content specifically designed for display on a desktop PC may not be pushed out to mobile devices, or vice versa).

Domain/web site constraints (e.g., only push out web pages from forbes.com).

Domain/web site classifications (e.g., via a third party classifier, for instance, only push out web pages classified as business sites, e-commerce sites, forum sites, news sites, etc.).

Site layout classifications (e.g., relative positions of headers, body, tools, advertisements, widgets, etc. within the web page may be used to determine whether or not to not push out an AJAX (asynchronous Java/XML data transfer) request associated with an ad impression to more than one device).

Device-specific domain/content/classification learning (e.g., learn the affinity of the user to use each device to view a certain type of content, certain web site, certain content classification, etc., and then only push content relevant to the type usually consumed by the device or the user).

Devices designated as a content publisher, content receiver, or both. Publishing devices push content viewed on that device to the cloud-based service for distribution to other registered devices. Receiving devices listen for and collect content from publishing devices.

Logical filters (e.g., do not automatically push PDF files over 50 pages in length, or files over 100 Mb in size)

User-defined rules (e.g., the user may select one or more of the rules disclosed herein in various combinations, modify existing rules, and/or define new rules).

Hard-coded rules (e.g., predefined rules that the user cannot define or override).

One or more hard-coded rules, applied by default, that the user can override with one or more user-defined rules, such as described herein.

In some embodiments, the rules can be overridden when the user manually requests the cloud-based server to push the web content to one or more registered devices.

In some embodiments, after a registered device has requested a web page, the scroll position within the web page is transferred to other registered devices so that when the user switches from one device to another, she resumes at the same point where she left off. Since the same content displayed on different devices may have different formats, a transformation algorithm can be implemented by the cloud-based service to match the scroll position of one device with a corresponding scroll position of another device. One technique for transforming the scroll position is to capture the top line of text that is currently being displayed (e.g., in HTML form), using an adequate amount of such text to obtain a certain level of uniqueness with respect to other portions of the content. As the user changes the scroll position, the top line of text is sent to the cloud-based service (e.g., on a periodic basis, or in near-real time as the scroll position changes). The cloud-based service performs a matching algorithm with the content as formatted for each device, and marks the scroll position within the content wherever the closest match of text is found (e.g., using an HTML Document Object Model (DOM) object). In this manner, when the device loads the content pushed to it by the cloud-based service, the content will automatically scroll to the designated scroll position. If no match of the text is found, a scroll position ratio (e.g., a ratio of the scroll position to the length of the document, such as 20% from the beginning or 80% from the end) can be used to transfer the scroll position from one device to another. In some embodiments, the scroll position can be adjusted or ignored using a set of rules based on, for example, document type, whether or not the document was closed by the user, and whether the document was requested multiple times. For instance, if a different user is requesting the same content on a different registered device, it may be desirable to restore the scroll position to the top of the document, since one user may not wish to begin consuming the content at the same scroll position as another user. In still other cases, the user may be prompted to select the scroll position using, for example, a radio button (e.g., top, middle, bottom, previous scroll position, etc.), or other suitable user interface.

In some embodiments, a navigation tool may be provided to enable the user to find content pushed to the device. For example, a list of published items may be available via a browser plug-in module on each registered device, sorted based on how recent the content was retrieved. The list may be maintained using a customizable time-to-live (TTL), which automatically deletes items on the list once they have reached a certain age, and/or using a manual delete option.

System Architecture

FIG. 1 illustrates a client-server system configured in accordance with an embodiment of the present invention. One or more clients, indicated as Client 1, and Client 2 through Client n, each include a user computing system having a browser application (e.g., Microsoft Internet Explorer®, Mozilla Firefox®, Safari®, Google Chrome®, or Opera®) or other application that can be used to request and receive content from a content provider via a cloud-based service, and a local cache for storing the content. A local cache may include, for example, a block of memory readily accessible by a processor. The cache may be, for example, memory that is on-board with, or sufficiently proximal to, the processor so as to allow for efficient access to content stored in the cache. Each client is operatively connected via a communications network (e.g., the Internet or an intranet) to the cloud-based service. The cloud-based service includes a content sharing module, a set of predefined rules and a shared cache for storing the content requested by one or more of the clients and any associated assets. In turn, the cloud-based server is operatively connected via the network (or possibly a different network) to the content provider, which may include one or more web servers that serve the requested content to the cloud-based server.

Such a client-server system may be suitable, for example, for accessing any online service (e.g., social networking, topical blogs or information source, cloud-based tools and applications, to name a few), or any other network-based system where it is desirable to allow multiple clients to receive the same web content in response to a content request from any one of the clients. To this end, each client wishing to receive the same content is registered with the cloud-based service, which in turn pushes the content out to each registered client in response to the content request. Further details of the operation of the client-server system of FIG. 1 will be discussed below with respect to FIGS. 2, 3*a*-*b* and 4.

The network can be any communications network, such as a user's local area network and/or the Internet, or any other public and/or private communication network (e.g., local and/or wide area network of a company, etc). The user's computing system (client) can be implemented with any suitable computing device, such as a laptop, desktop, tablet, smartphone, or other suitable computing device capable of accessing a server via a network and displaying content to a user. The browser application can be implemented using any number of known or proprietary browsers or comparable technology that facilitates retrieving, presenting, and traversing information resources on a network, such as the Internet.

As will be appreciated in light of this disclosure, the various modules and components of the system shown in FIG. 1, such as the content sharing module, can be implemented in software, such as a set of instructions (e.g. C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Use-Cases

Figure 2:
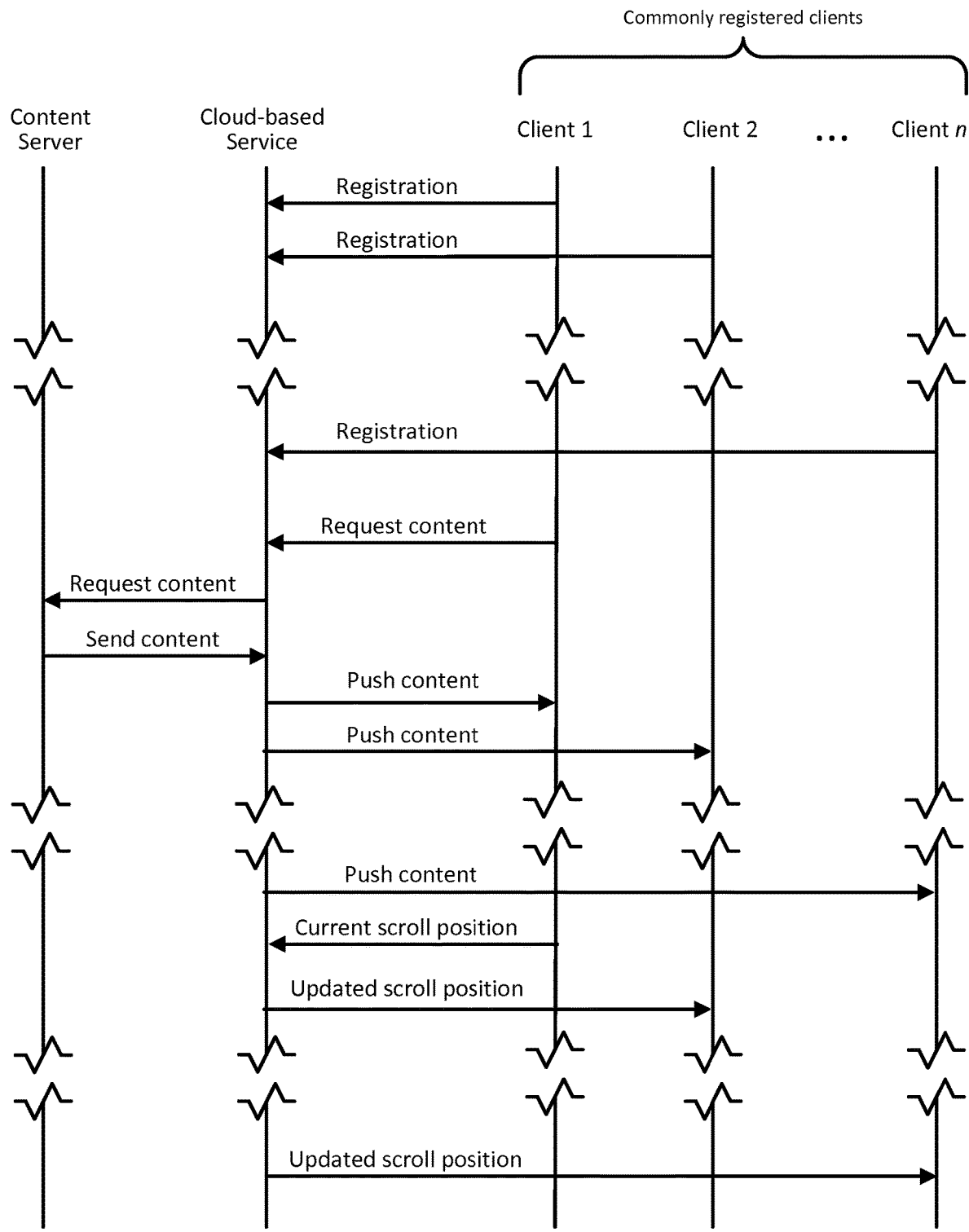
FIG. 2 illustrates an example data flow of a client-server system, in accordance with an embodiment of the present invention.

FIG. 2 illustrates an example data flow of a client-server system, such as the one shown in FIG. 1, in accordance with an embodiment. It will be understood that the order or sequence of the data flow shown is merely one example, and that embodiments may be practiced using various orderings or sequencings not specifically shown or described, as will be apparent in light of this disclosure. Initially, each client (i.e., Client 1, Client 2, . . . , Client n) separately registers with the cloud-based service. Registration includes providing a unique identifier, such as a HTTP User-Agent string, to the cloud-based service. The unique identifier allows the cloud-based service to recognize the device as being associated with a particular account. As a result of registration, the account may have any number of clients (e.g., Clients 1 through n) associated with it. Subsequent to registration, any one of the registered clients (e.g., Client 1) requests web content from a content provider. The request is initially received from the client by the cloud-based service. At this point, the content request has not yet reached the content provider. It will be appreciated that in some embodiments, the cloud-based service may be co-located with the content provider. Not shown in FIG. 2, but described in further detail below with respect to FIG. 4, the cloud-based service applies a set of predefined rules to the content request to determine which content and associated assets need to be requested from the content server to ensure that the content is suitably formatted for each registered client. Next, the cloud-based service requests the content from the content server. One or more separate requests may be sent to the content server for retrieving the content and corresponding assets. In response to the request or requests, the content server sends the content and corresponding assets back to the cloud-based service.

Once the content has been received by the cloud-based service, the content is stored in the shared cache, and then pushed out to each registered client in a format suitable for consumption by the client browser. For example, if Client 1 includes a Windows®-based browser and Client 2 includes an iOS®-based browser, the content pushed out to Client 1 may have a different format than the content pushed out to Client 2. The format determination is made automatically by the cloud-based service based on information associated with the unique identifier (e.g., the type of device, version of browser, etc.) and a set of predefined rules, such as described above. Each client receives the content and stores it in a local cache for subsequent consumption using the browser.

Figure 3A:
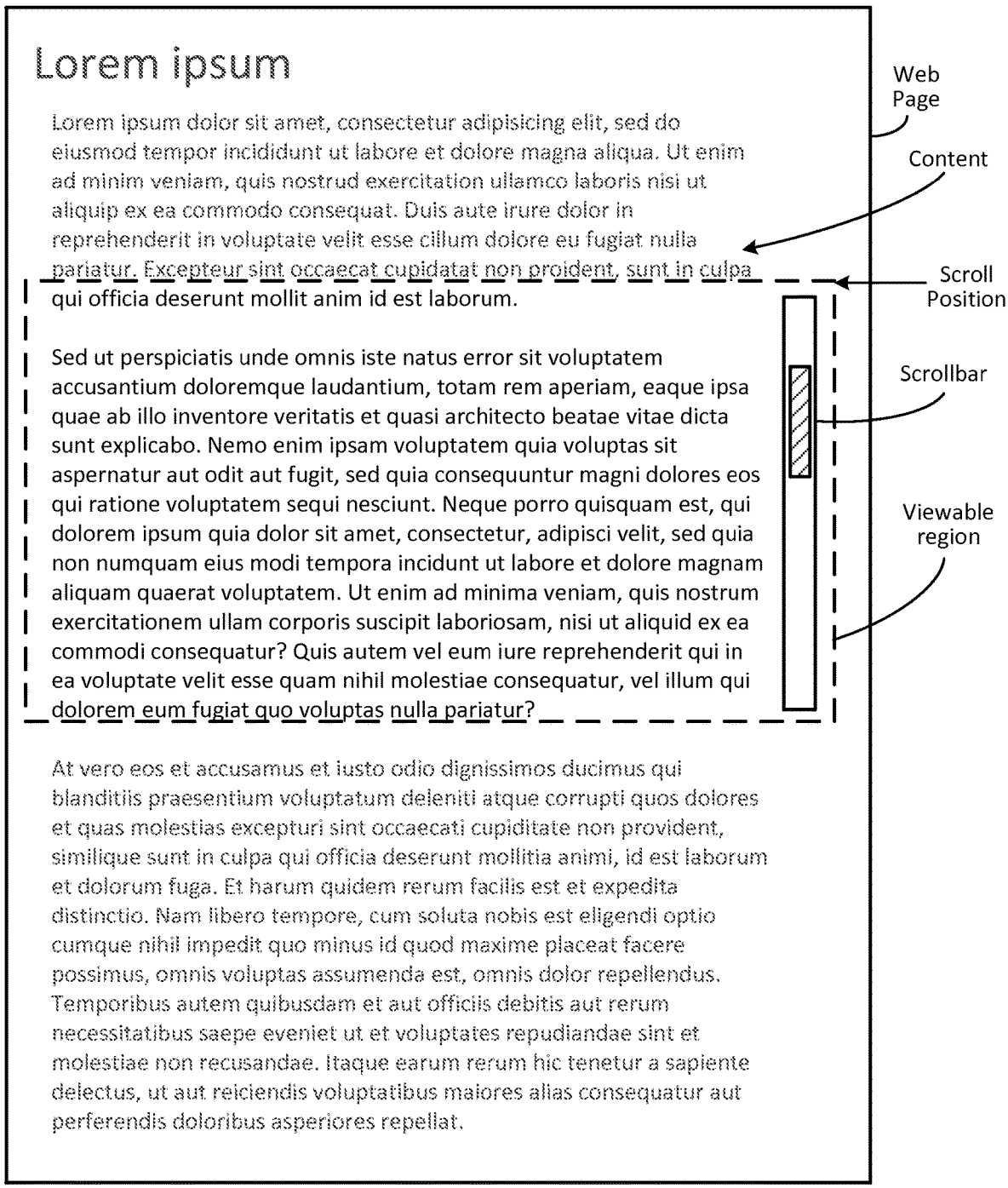
FIGS. 3a and 3b illustrate an example web page that can be used in accordance with an embodiment of the present invention.
Figure 3B:
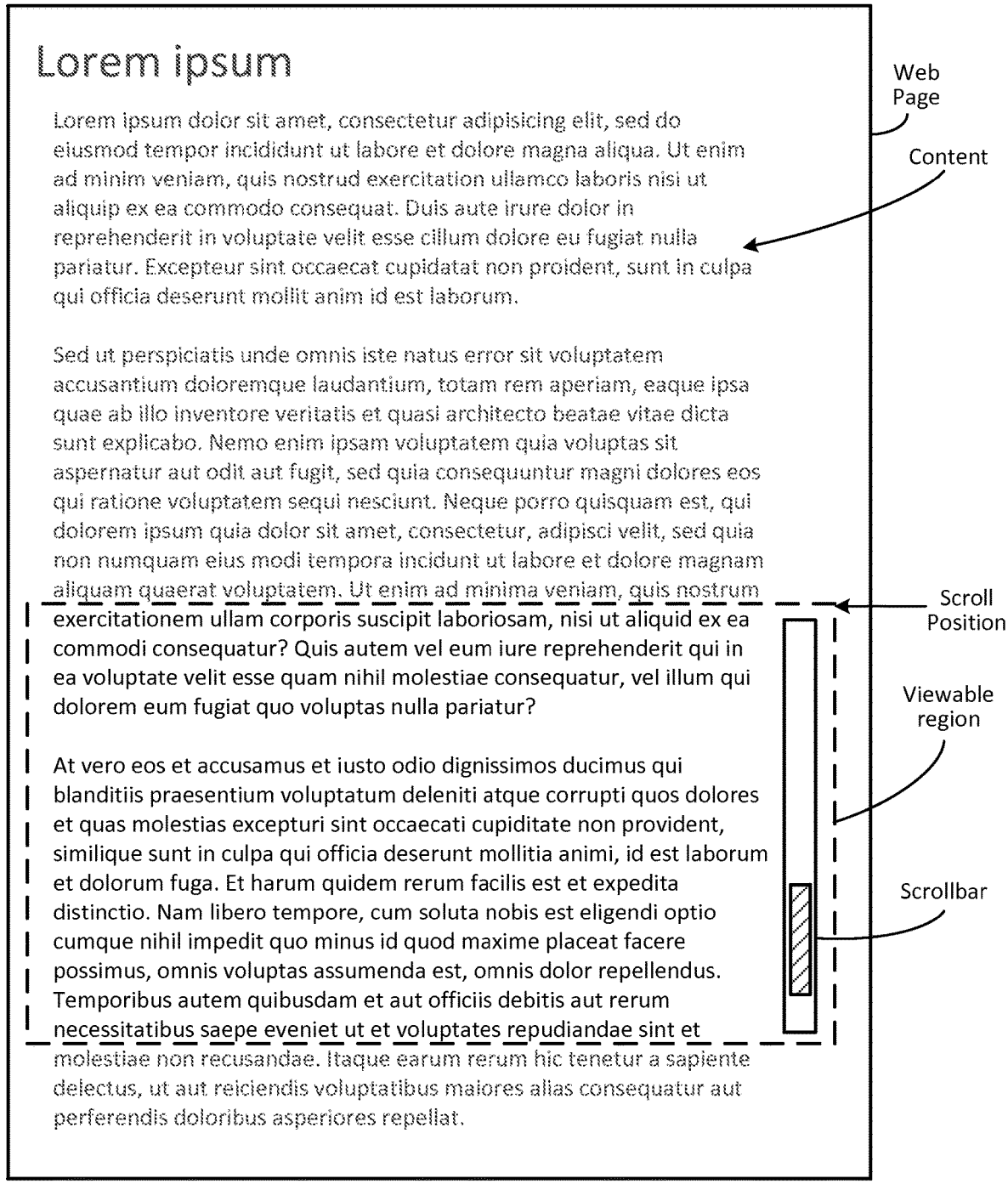

FIGS. 3*a* and 3*b* illustrate an example web page that can be used in accordance with an embodiment. The web page may include any type of content, such as text, graphics, audio, video and the like. Due to the physical limitations of each client device (e.g., display size and resolution), in some instances only a portion of the entire web page can be displayed at once. The viewable region is the portion of the web page that is displayed at any given time. The user can change the position of the viewable region by scrolling through the web page using, for example, a scrollbar or other suitable user interface (e.g., page up/down keys on a keyboard, scroll wheel on a mouse, etc.). The beginning of the viewable region is referred to as the scroll position, which varies as the user scrolls through the web page. It will be understood that any reference point within the web page may be used to define the scroll position; the top is merely one of many convenient reference points. FIG. 3a illustrates the viewable region of the web page at a first scroll position, and FIG. 3b illustrates the viewable region of the same web page at a second scroll position after the user has scrolled down the page.

Referring again to FIG. 2, as the user changes the scroll position on any registered client (e.g., Client 1), the current scroll position is sent to the cloud-based service. If the formatting of the content is different for different clients, the cloud-based service then transforms the current scroll position of the client to match the corresponding scroll position within the formatting of the content on one or more of the other registered clients. For example, if the viewable region of Client 2 is narrower (e.g., fewer characters or pixels per line or row) than the viewable region of Client 1, the scroll positions of the two devices may not be the same (e.g., the scroll position of Client 2 may be relatively higher or lower within the web page then the scroll position of Client 1). Therefore, the cloud-based service transforms the scroll position for Client 2 based on a set of rules, such as by adjusting the viewable region of Client 2 so that the top line of text matches the top line of text in the viewable region of Client 1. The updated scroll position is then pushed out to each registered client. Each client may use the updated scroll position to automatically adjust the respective viewable region on the device so that when the user switches to the device (e.g., switches from using Client 1 to using Client 2), the viewable region begins where the user left off. This process of transforming the updated scroll position may be repeated indefinitely (e.g., until the user closes the browser, loads different content, or manually disables the automatic scroll position updates for one or more registered clients).

Methodology

Figure 4:
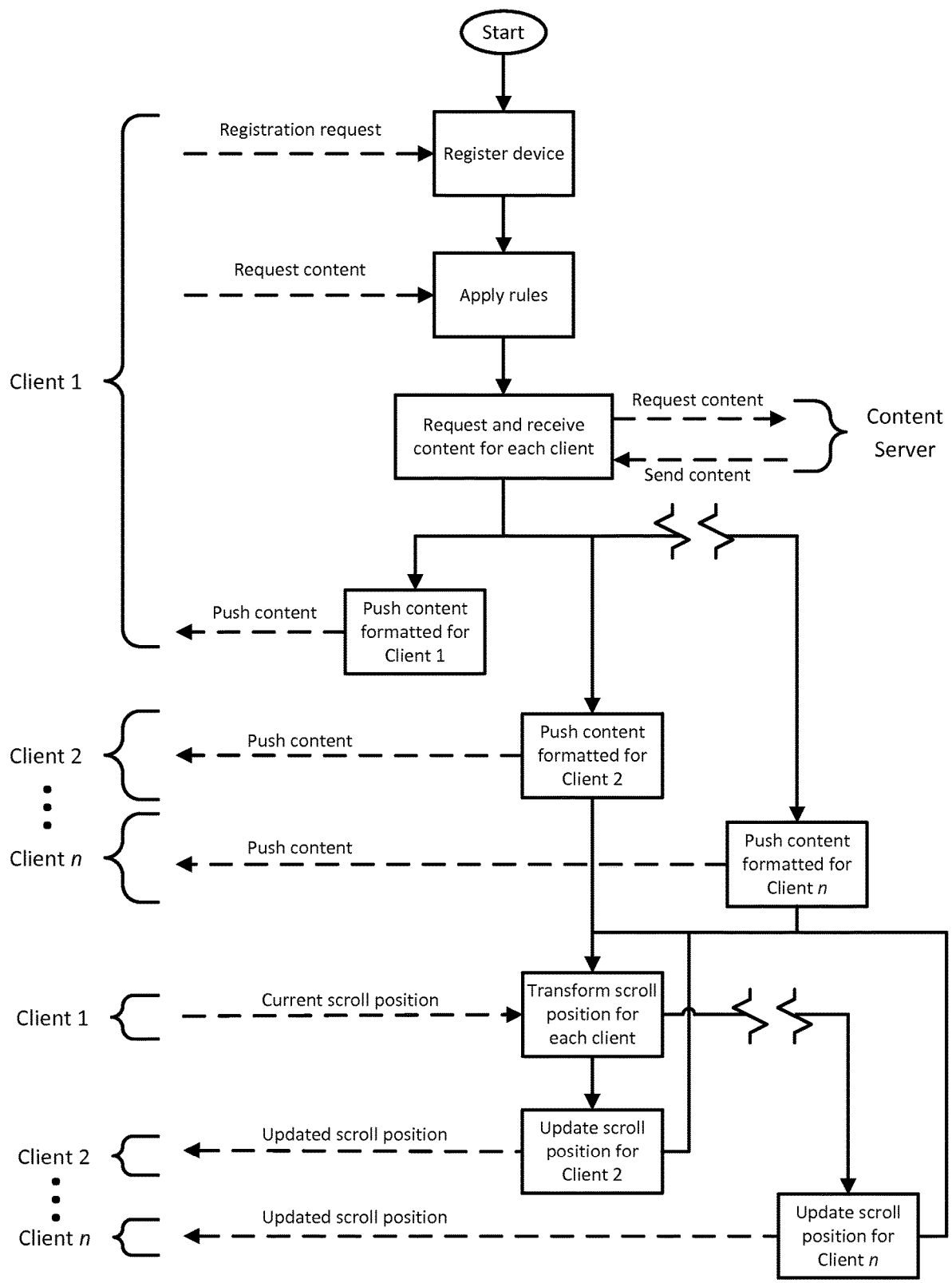
FIG. 4 illustrates a cloud-based methodology for sharing and consuming web content, in accordance with an embodiment of the present invention.

FIG. 4 illustrates an example methodology for sharing and consuming web content across multiple devices, according to an embodiment. As previously explained, this method can be carried out, for example, via a content sharing module on a cloud-based service, such as shown and described with respect to FIG. 1, or other code embedded or otherwise executable within the cloud-based service for a given page of web content served to a client.

The method begins by registering each device associated with Clients 1 through n. When a registration request is received from a client, the client is added to a list of clients registered to an account. Such a list may be maintained, for example, in a database. The registration request may include a unique identifier that identifies the client and type of device. For clarity, in FIG. 4 a registration request is shown only for Client 1; however, registration requests can be similarly received and processed from any of the Clients 1 through n.

Subsequent to registration of at least one device, a request for web content may be received from a registered client (e.g., Client 1). The request may include, for example, a uniform resource locator (URL) or uniform resource identifier (URI) referring to a web-based resource for the content. In response to receiving the request for web content, the method continues by applying a set of predefined rules to the request, such as described above, to determine which content and associated assets need to be requested from a content server, in conjunction with the request for web content, to ensure that the content is formatted appropriately for each registered client. For example, if Client 1 includes a Windows®-based browser and Client 2 includes an iOS®-based browser, different requests for the web content may be sent to the content server so that the content is received in a suitable format for each client device (e.g., desktop and mobile versions of a web page). Once the rules have been applied to the request for web content, the request or requests are sent to the content server. In response to the request for web content, the content server sends the content, which is received and pushed out to each client (e.g., Clients 1 through n) in the appropriate format for the respective client. In this manner, a request for web content received from one registered client will result in the same content being pushed out to all registered clients.

Once any one of the clients receives the content pushed out to it, a user may begin consuming the content, for example, by scrolling through the content. As the user scrolls, the corresponding scroll position changes and is reported to the cloud-based service as the current scroll position. The method continues by transforming the current scroll position for one client into an updated scroll position for one or more other clients, such as described above with respect to FIGS. 3a and 3b, adjusting to compensate for differences between the respective content formats on each client. For example, method may compute the scroll position for Client 2 based on a set of rules, such as by adjusting the viewable region of Client 2 so that the top line of text matches the top line of text in the viewable region of Client 1. The transformed updated scroll position is then pushed out to each registered client as an instruction to display the content at the updated scroll position. This process of transforming the current scroll position and pushing out the updated scroll position may continue indefinitely and at any time (e.g., immediately in response to a change of the current scroll position, or at periodic intervals of time) at least until the user discontinues consuming the web content on any registered device or requests additional web content. Other specific implementations will be apparent in light of this disclosure.

Numerous embodiments will be apparent, and features described herein can be combined in any number of configurations. One example embodiment of the present invention provides a computer-implemented data processing method. The method includes receiving, via a communications network, a first content request from a first device registered with a cloud-based service, applying a set of predetermined rules to the first content request to produce a second content request for content associated with the first content request to be returned in a first format compatible with the first device and a second format compatible with a second device registered with the cloud-based service, and sending the second content request to a content provider. The method further includes receiving, in response to the second content request, content associated with the second content request and formatted in the first format and the second format, and sending, via the communications network, the content formatted in the first format to the first device and the content formatted in the second format to the second device. In some cases, the method includes receiving, from the first device via the communications network, a current scroll position within the content formatted in the first format, computing an updated scroll position within the content formatted in the second format based at least in part on the current scroll position, where the updated scroll position is the same as the current scroll position adjusted to compensate for differences between the first format and the second format, and sending, to the second device via the communications network, an instruction to display the content formatted in the second format at the updated scroll position. In some such specific cases, the updated scroll position may be computed at least in part based on text at or near the current scroll position. In some cases, the method includes compressing the content prior to sending the content to the first device and the second device. In some cases, the method includes sending, to the second device via the communication network, a list representing the content. In some cases, the first format is different than the second format. In some cases, the method includes propagating metadata associated with the content from the first device to the second device via the communications network. In some cases, the set of predefined rules includes one or more of the following: an amount of time a user spent viewing the content on at least one of the first device and the second device; a context of content; a domain or web site associated with the content; a classification associated with the content; a layout associated with the content; a type of content previously consumed by at least one of the first device and the second device, and whether at least one of the first device and the second device is at least one of a content publisher and content consumer.

Another embodiment provides a data processing system having a storage and a processor operatively coupled to the storage. The processor is configured to receive, via a communications network, a content request from a first device registered with a cloud-based service, apply a set of predetermined rules to the first content request to produce a second content request for content associated with the first content request to be returned in a first format compatible with the first device and a second format compatible with a second device registered with the cloud-based service, and send, via the communications network, the content formatted in the first format to the first device and the content formatted in the second format to the second device. In some cases, the processor is configured to receive, from the first device via the communications network, a current scroll position within the content formatted in the first format, compute an updated scroll position within the content formatted in the second format based at least in part on the current scroll position, where the updated scroll position is the same as the current scroll position adjusted to compensate for differences between the first format and the second format, and send, to the second device via the communications network, an instruction to display the content formatted in the second format at the updated scroll position. In some such specific cases, the updated scroll position may be computed at least in part based on text at or near the current scroll position. In some cases, the processor is configured to compress the content prior to sending the content to the first device and the second device. In some cases, the processor is configured to send, to the second device via the communication network, a list representing the content. In some cases, the first format is different than the second format. In some cases, the processor is configured to propagate metadata associated with the content from the first device to the second device via the communications network. In some cases, the set of predefined rules includes one or more of the following: an amount of time a user spent viewing the content on at least one of the first device and the second device; a context of content; a domain or web site associated with the content; a classification associated with the content; a layout associated with the content; a type of content previously consumed by at least one of the first device and the second device; and whether at least one of the first device and the second device is at least one of a content publisher and content consumer. Variations will be apparent. For instance, another example embodiment provides a non-transient computer-readable medium having instructions encoded thereon that when executed by a processor cause the processor to perform the functionality of the system as variously defined in this paragraph.

Another embodiment provides a computer-implemented data processing method. The method includes receiving, via a communication network, a first registration request associated with a first device and a second registration request associated with a second device. The first registration request includes a first unique identifier for identifying the first device, and the second registration request includes a second unique identifier for identifying the second device. The method further includes storing the first unique identifier in a list of registered devices associated with an account, and storing the second unique identifier in the list of registered devices associated with the account. The method further includes receiving, via the communication network, a content request from the first client device, and sending, via the communication network, content associated with the content request formatted in a first format compatible with first device to the first device based on the first unique identifier being stored in the list of registered devices, and sending, via the communication network, the content formatted in a second format compatible with the second device to the second device based on the second unique identifier being stored in the list of registered devices.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented data processing method comprising:
    receiving, at a cloud-based service, from a first device registered with the cloud-based service, a first content request to provide digital content in a first format that is associated with the first device;
    in response to receiving the first content request, producing, at the cloud-based service, a second content request to provide the digital content in a second format that is associated with a second device that is registered with the cloud-based service;
    sending the first and second content requests from the cloud-based service to a content provider, such that receipt of the first content request at the cloud-based service results in multiple content requests for the digital content being sent from the cloud-based service to the content provider;
    receiving, at the cloud-based service, from the content provider, a first version of the digital content formatted in the first format and a second version of the digital content formatted in the second format;
    in response to applying a set of one or more predefined rules to the first content request, determining that (a) the first version of the digital content should be transmitted from the cloud-based service to the first device automatically, and (b) the second version of the digital content should not be transmitted from the cloud-based service to the second device automatically, but instead should be queued at the cloud-based service;

in response to receiving the first version of the digital content from the content provider, sending the first version of the digital content from the cloud-based service to the first device;

in response to receiving, at the cloud-based service, a request to send the second version of the digital content to the second device, sending the second version of the digital content from the cloud-based service to the second device;

receiving, from the first device, a plurality of current scroll positions within the first version of the digital content, each of the current scroll positions including a segment of text forming the digital content;

computing an updated scroll position within the second version of the digital content by matching (a) a segment of text associated with a most recent of the plurality of current scroll positions with (b) a portion of text in the second version of the digital content; and sending the updated scroll position to the second device.

2. The method of claim 1, further comprising compressing the first version of the digital content prior to sending the first version of the digital content to the first device.

3. The method of claim 1, further comprising sending, from the cloud-based service to the second device, a list of content items received from the content provider.

4. The method of claim 1, wherein the first format is different than the second format.

5. The method of claim 1, further comprising propagating metadata associated with the digital content from the first device to the second device.

6. The method of claim 1, wherein the set of one or more predefined rules further includes at least one of:
a domain or web site associated with the digital content; and
a layout associated with the digital content.

7. The method of claim 1, further comprising compressing the first and second versions of the digital content before sending the first and second versions of the digital content to the first and second devices, respectively.

8. The method of claim 1, further comprising sending, to the second device, a list of content items received from the content provider, wherein the list is sorted based on how recently the listed content items were received from the content provider.

9. The method of claim 1, further comprising:
sending, to the second device, a list of content items received from the content provider; and
deleting a stale content item from the list based on an age of the stale content item.

10. A data processing system, comprising:
a storage; and
a processor operatively coupled to the storage and configured to:
receive, at a cloud-based service, from a first device registered with the cloud-based service, a first content request to provide digital content in a first format that is associated with the first device;
in response to receiving the first content request, produce, at the cloud-based service, a second content request to provide the digital content in a second format that is associated with a second device that is registered with the cloud-based service;
send the first and second content requests from the cloud-based service to a content provider, such that receipt of the first content request at the cloud-based service results in multiple content requests for the digital content being sent from the cloud-based service to the content provider;
receive, at the cloud-based service, from the content provider, a first version of the digital content formatted in the first format and a second version of the digital content formatted in the second format;
in response to applying a set of one or more predefined rules to the first content request, determine that (a) the first version of the digital content should be transmitted from the cloud-based service to the first device automatically, and (b) the second version of the digital content should not be transmitted from the cloud-based service to the second device automatically, but instead should be queued at the cloud-based service;
in response to receiving the first version of the digital content from the content provider, send the first version of the digital content from the cloud-based service to the first device;
in response to receiving, at the cloud-based service, a request to send the second version of the digital content to the second device, send the second version of the digital content from the cloud-based service to the second device;
receive, from the first device, a plurality of current scroll positions within the first version of the digital content, each of the current scroll positions including a segment of text forming the digital content;
compute an updated scroll position within the second version of the digital content by matching (a) a segment of text associated with a most recent of the plurality of current scroll positions with (b) a portion of text in the second version of the digital content; and
send the updated scroll position to the second device.

11. The system of claim 10, wherein the processor is further configured to compress the first version of the digital content prior to sending the first version of the digital content to the first device.

12. The system of claim 10, wherein the processor is further configured to send, from the cloud-based service to the second device, a list of content items received from the content provider.

13. The system of claim 10, wherein the first format is different than the second format.

14. The system of claim 10, wherein the processor is further configured to propagate metadata associated with the digital content from the first device to the second device.

15. The system of claim 10 wherein the set of one or more predefined rules further includes at least one of:
a domain or web site associated with the digital content; and
a layout associated with the digital content.

16. A non-transitory computer-readable medium having instructions encoded thereon that when executed by a processor cause the processor to:
receive, at a cloud-based service, from a first device registered with the cloud-based service, a first content request to provide digital content in a first format that is associated with the first device;
in response to receiving the first content request, produce, at the cloud-based service, a second content request to provide the digital content in a second format that is associated with a second device that is registered with the cloud-based service;
send the first and second content requests from the cloud-based service to a content provider, such that receipt of the first content request at the cloud-based service results in multiple content requests for the digital content being sent from the cloud-based service to the content provider;

receive, at the cloud-based service, from the content provider, a first version of the digital content formatted in the first format and a second version of the digital content formatted in the second format;

in response to applying a set of one or more predefined rules to the first content request, determine that (a) the first version of the digital content should be transmitted from the cloud-based service to the first device automatically, and (b) the second version of the digital content should not be transmitted from the cloud-based service to the second device automatically, but instead should be queued at the cloud-based service;

in response to receiving the first version of the digital content from the content provider, send the first version of the digital content from the cloud-based service to the first device;

in response to receiving, at the cloud-based service, a request to send the second version of the digital content to the second device, send the second version of the digital content from the cloud-based service to the second device;

receive, from the first device, a plurality of current scroll positions within the first version of the digital content, each of the current scroll positions including a segment of text forming the digital content;

compute an updated scroll position within the second version of the digital content by matching (a) a segment of text associated with a most recent of the plurality of current scroll positions with (b) a portion of text in the second version of the digital content; and send the updated scroll position to the second device.

17. The non-transitory computer-readable medium of claim 16, further comprising instructions that when executed by the processor cause the processor to compress the first version of the digital content prior to sending the first version of the digital content to the first device.

18. The non-transitory computer-readable medium of claim 16, further comprising instructions that when executed by the processor cause the processor to propagate metadata associated with the digital content from the first device to the second device.

19. The non-transitory computer-readable medium of claim 16, further comprising instructions that when executed by the processor cause the processor to send, to the second device, a list of content items received from the content provider.

20. The non-transitory computer-readable medium of claim 16, further comprising instructions that when executed by the processor cause the processor to send, to the second device, a list of content items received from the content provider, wherein the list is sorted based on how recently the listed content items were received from the content provider.

21. The non-transitory computer-readable medium of claim 16, further comprising instructions that when executed by the processor cause the processor to:
  send, to the second device, a list of content items received from the content provider; and
  delete a stale content item from the list based on an age of the stale content item.

* * * * *